(12) United States Patent
Rager (10) Patent No.: US 12,152,987 B2
(45) Date of Patent: Nov. 26, 2024

(54) MICROPLATE READER

(71) Applicant: BMG Labtech GmbH, Ortenberg (DE)

(72) Inventor: Stefan Rager, Hohberg (DE)

(73) Assignee: BMG Labtech GmbH, Ortenberg (DE)

( * ) Notice: Subject to any disclaimer, the term of this patent is extended or adjusted under 35 U.S.C. 154(b) by 486 days.

(21) Appl. No.: 17/503,732

(22) Filed: Oct. 18, 2021

(65) Prior Publication Data

US 2022/0128470 A1 Apr. 28, 2022

(30) Foreign Application Priority Data

Oct. 23, 2020 (DE) .......................... 102020128003.3

(51) Int. Cl.
| | | |
|---|---|---|
| *G01J 3/44* | (2006.01) | |
| *B01L 3/00* | (2006.01) | |
| *B01L 9/00* | (2006.01) | |
| *G01N 21/64* | (2006.01) | |

(52) U.S. Cl.
CPC ...... *G01N 21/6452* (2013.01); *B01L 3/50851* (2013.01); *B01L 9/523* (2013.01)

(58) Field of Classification Search
CPC .......... G01N 21/6452; G01N 21/0332; G01N 2021/0367; G01N 2021/0371; G01N 2035/00356; G01N 2035/0424; G01N 21/253; B01L 3/50851; B01L 9/523
See application file for complete search history.

(56) References Cited

U.S. PATENT DOCUMENTS

| | | | |
|---|---|---|---|
| 4,225,410 A | 9/1980 | Pace | |
| 5,849,486 A | 12/1998 | Heller et al. | |
| 5,955,028 A | 9/1999 | Chow | |
| 8,858,886 B1 | 10/2014 | Chuah et al. | |
| 10,369,573 B2 | 8/2019 | Morris et al. | |
| 2001/0033381 A1* | 10/2001 | Stumbo ................ | G01N 35/028 |
| | | | 356/440 |
| 2001/0045358 A1 | 11/2001 | Kofp-Sill et al. | |

(Continued)

FOREIGN PATENT DOCUMENTS

| | | |
|---|---|---|
| DE | 29906382 | 11/1999 |
| DE | 202006010764 | 11/2006 |

(Continued)

*Primary Examiner* — Abdullahi Nur
(74) *Attorney, Agent, or Firm* — Volpe Koenig (57) ABSTRACT

A microplate reader having a receiving apparatus for receiving a microplate having predefined dimensions and a multiplicity of wells, and an optical detector for detecting an optical radiation at respective individual ones of the wells of a microplate that in the receiving apparatus. The receiving apparatus is arranged to be movable in at least one spatial direction by a positioning mechanism to position the received microplate relative to the optical detector for successive measurements at different wells. The movable receiving apparatus has an interface device configured to provide an energy and/or data connection and/or a media supply connection and/or media disposal from the microplate reader to an accessory apparatus for additional functions. The interface device enables additional hardware provided as an accessory apparatus, which can be inserted into the receiving apparatus jointly with or instead of a microplate or some other sample container, to be supplied with energy and communication.

21 Claims, 4 Drawing Sheets

(56) References Cited

U.S. PATENT DOCUMENTS

| | | | |
|---|---|---|---|
| 2003/0215357 A1 | 11/2003 | Malterer et al. | |
| 2005/0051723 A1* | 3/2005 | Neagle | C12M 23/50 |
| | | | 250/306 |
| 2005/0269494 A1* | 12/2005 | Nakama | G01N 21/253 |
| | | | 250/234 |
| 2006/0133959 A1* | 6/2006 | Wang | G01N 21/253 |
| | | | 422/82.08 |
| 2007/0188750 A1 | 8/2007 | Lundquist et al. | |
| 2007/0248494 A1 | 10/2007 | Mokelke et al. | |
| 2008/0014571 A1* | 1/2008 | Teich | G01N 21/7703 |
| | | | 435/287.1 |
| 2008/0044879 A1 | 2/2008 | Harjes et al. | |
| 2009/0104078 A1* | 4/2009 | Seguin | B01L 3/0268 |
| | | | 422/400 |
| 2010/0184616 A1 | 7/2010 | Hillendahl et al. | |
| 2010/0203573 A1 | 8/2010 | Heinonen et al. | |
| 2011/0076690 A1 | 3/2011 | Gumbrecht et al. | |
| 2013/0038873 A1 | 2/2013 | Curtis et al. | |
| 2016/0003859 A1 | 1/2016 | Wenczel et al. | |
| 2016/0169808 A1* | 6/2016 | Atzler | G01N 27/223 |
| | | | 435/8 |
| 2017/0209862 A1* | 7/2017 | Dutry | B01L 3/502715 |
| 2017/0212050 A1 | 7/2017 | Hensley | |
| 2018/0031551 A1 | 2/2018 | Karlovac et al. | |
| 2018/0059132 A1* | 3/2018 | Christey | G06T 7/74 |
| 2018/0131414 A1 | 5/2018 | Katzlinger et al. | |
| 2019/0221005 A1 | 7/2019 | OConnor | |

FOREIGN PATENT DOCUMENTS

| | | |
|---|---|---|
| DE | 102018200646 | 7/2019 |
| EP | 0938383 | 8/2000 |
| EP | 1284158 | 2/2003 |
| EP | 1291625 | 12/2003 |
| EP | 2428792 | 10/2014 |
| EP | 2639292 | 11/2017 |
| JP | 2009121818 | 6/2009 |
| WO | 02072423 | 9/2002 |
| WO | 2009117147 | 9/2009 |
| WO | 2012032124 | 3/2012 |
| WO | 2013039738 | 3/2013 |
| WO | 2016205736 | 12/2016 |

* cited by examiner

MICROPLATE READER

INCORPORATION BY REFERENCE

The following documents are incorporated herein by reference as if fully set forth: German Patent Application No. 10 2020 128 003.3, filed Oct. 23, 2020.

TECHNICAL FIELD

The present invention relates to a microplate reader comprising a receiving apparatus for receiving a microplate having predefined dimensions and having a multiplicity of wells, and comprising an optical detector for detecting an optical radiation at respective individual wells from among the wells of a microplate that has been received in the receiving apparatus, wherein the receiving apparatus is arranged such that it is movable in at least one spatial direction by way of a positioning mechanism in order to position the received microplate in relation to the optical detector for successive measurements at different wells.

BACKGROUND

A microplate is a sample carrier for carrying out photometric or other measurements which has a multiplicity of wells arranged at regular distances, and samples can be pipetted into said wells. Microplates have standardized dimensions with the same basic area in each case and a variable height in some instances and are available with different numbers of wells, for example 6×8, 8×12, 16×24, 32×48 or 48×72 wells. A microplate reader serves for "reading" microplates by carrying out photometric measurements on the individual wells. For this purpose, a microplate reader has an optical detector such as a photomultiplier, for instance, which detects optical radiation passing through or emanating from the samples contained in the individual wells on account of absorption, luminescence or fluorescence. For this purpose, the microplate is inserted into a receiving apparatus, which is movable in the X- and Y-directions by way of a positioning mechanism. For the purpose of sequentially reading the individual wells, the latter are brought into the detection region of the optical detector successively by the positioning mechanism.

The photometric examination of series of samples by means of a microplate reader is used in broad fields of application, inter alia for identifying biological, chemical, biochemical or physical reactions of the samples. Depending on the application, additional functions may be required in order to initiate corresponding reactions, to maintain them, or to support them in some other way. Furthermore, measuring sensors may also be required for additional measurement functions. If such additional functions are required, corresponding equipment has to be integrated into the microplate reader. Corresponding application-specific adaptations are complex and expensive and moreover have to be taken into account as early as in the conception and design of the overall reader.

Furthermore, it may be necessary, for the purpose of calibration and qualification, to provide additional sensors in the reader in order to check whether the reader complies with the corresponding specifications and in order to adjust reader parameters if necessary. Such checks and adjustments on the reader may be necessary both prior to delivery and in the course of the lifetime of the corresponding reader. Such additional sensors likewise increase the complexity of the reader.

SUMMARY

It is therefore an object of the present invention to specify a microplate reader which is able to be used flexibly in different fields of application and in particular enables additional functions to be retrofitted.

The object is achieved by a microplate reader with one or more of the features described herein. Advantageous configurations can be gathered from the following description and claims. Furthermore, accessory apparatuses that can be used with the microplate reader according to the invention are also provided.

According to the invention, in the case of a microplate reader of the type mentioned in the introduction, it is provided that the movably arranged receiving apparatus for microplates has an interface device configured to provide an energy and/or data connection—preferably energy and data connection—and/or a connection for media supply and/or media disposal from the microplate reader to an accessory apparatus for additional functions that is inserted into the receiving apparatus jointly with or instead of a microplate or some other sample container.

The receiving apparatus is positionable by way of the positioning mechanism preferably in two spatial directions (X- and Y-directions) relative to the optical detector for successive measurements at different wells. However, it is also conceivable for the optical detector to consist of a plurality of sensors that can be used to measure an entire line of wells in one step. In this case, the microplate is read line by line, such that the receiving apparatus needs to be adjustable in only one spatial direction relative to the detector.

The scope of the present invention also encompasses a microplate reader which has as optical detector an imaging detector such as, for instance, a CCD camera with a suitable magnifying optical unit (lens) or a microscope and is configured to generate series of images of the individual wells.

The interface device can be arranged on the receiving apparatus directly or a component mechanically connected to the receiving apparatus, for instance a slide of the positioning mechanism.

The interface device makes it possible to supply additional hardware in the form of an accessory apparatus with energy and communication. The receiving apparatus for microplates that is present anyway serves as a receptacle. Additional functions can thus be integrated in an accessory apparatus that is compatible with the receiving apparatus for microplates and the interface device provided there. The interface device mentioned initially has no influence on the overall reader. The insertion of a corresponding accessory apparatus into the receiving apparatus for microplates enables deep integration into the overall reader in conjunction with a high degree of automation. By way of software updates of a control apparatus of the microplate reader, even functions that had not yet been provided during the production of the microplate reader itself can be supported. A corresponding interface device in the receiving apparatus is universally useable and simple and cost-effective to realize. Application-specific additional functions can be relocated in separate accessory apparatuses. Additional functions including not just those provided by the manufacturer of the reader but those developed by the user himself/herself or by third parties can be realized with a separately produced accessory. Additional functions can be used in addition, in combination or even simultaneously with the basic functions of the microplate reader.

Within the scope of the present invention, the interface device can be configured in particular in such a way that the energy and/or data connection is established via electrical contacts, by means of optical signal transmission and/or by coupling by way of electric, magnetic or electromagnetic fields. The energy and/or data connection can thus be effected via a plug connection or else wirelessly. An energy transmission can be effected via electrical contacts or else inductively. In this case, the interface device can be based on conventional interface formats, for instance a USB connection for electrical power and data connection, or a wireless interface according to the RFID, WLAN and Bluetooth standards.

Within the scope of the invention, provision can be made for the interface device to comprise a media interface embodied by means of a tube connection for media supply or media disposal, in particular for supply with and/or disposal of at least one of the following media: air, $CO_2$, oxygen, nitrogen, water (optionally temperature-regulated for the purpose of cooling or heating the samples), reagents. In this way, reactions proceeding in the wells of a microplate can be supported, or maintained, or some other contribution can be made to the progression of such reactions.

In this case, the media interface can be embodied by a tube connection, in particular. For this purpose, a corresponding tube connection is preferably provided on the interface device and is connected to an appropriately matching counterpart situated on an accessory apparatus that interacts with the interface device.

Furthermore, within the scope of the present invention, provision can be made of a control device configured to activate via the interface device additional functions of an accessory apparatus that is inserted into the receiving apparatus jointly with or instead of a microplate. This can be done by enabling an energy supply or by means of corresponding control commands at a data interface. Such a control device can be embodied in particular as a programmable control device that is operated with a corresponding control program. A control program can be updated at any time in order thus to support and to activate additional functions of specific accessory apparatuses. Furthermore, in the reverse direction the control device receive data, in particular sensor data, measurement data, confirmation messages and the like from an accessory apparatus controlled via the interface device and processes them.

A corresponding accessory apparatus that interacts with the microplate reader comprises a counterpart station, which interacts with the interface device of the microplate reader and via which an additional function provided by the accessory is controlled and/or supplied with energy. Such an accessory apparatus can be inserted into the receiving apparatus of the microplate reader either jointly with a microplate or instead of such a microplate. The first-mentioned case, of course, also encompasses the situation in which the accessory apparatus is arranged in integrated fashion on a microplate. The use of an accessory apparatus instead of a microplate can be provided if the accessory apparatus provides additional functions for maintenance, qualification, calibration or cleaning of the microplate reader.

A further use of an accessory apparatus instead of a microplate can be provided if the accessory apparatus also carries one or more sample containers besides an additional function. In this case, the additional function serves for manipulation or measurement of the samples in the containers, which are expediently exchangeable and are standardized as consumables. Special containers, for example with electrodes incorporated, can also be configured exchangeably with the additional measurement electronics on the accessory apparatus in the format of the microplate.

An accessory apparatus inserted instead of a microplate, in addition to an additional function provided by it and connected via the interface device, can also be used as an adapter in order, according to a modular design principle, to receive one or more individual or interconnected (so-called stripes) sample containers and to adapt them to the standardized plate size (127.76 mm×85.48 mm as per the ANSI standard upon the recommendation of the Society for Biomolecular Screening). The accessory apparatus thus has a dual function, firstly as a mechanical adapter for sample containers having deviating dimensions, and secondly for implementing additional functions on the received sample containers.

A use of an accessory apparatus jointly with a microplate can be provided, in particular, in order to initiate or to support reactions proceeding in the wells of a microplate or to enable additional measuring methods. For joint use, the accessory apparatus above and/or below the microplate can carry a functional unit. In this case, an optical measurement can be effected from the respective opposite side. The accessory apparatus can also be designed such that light transmissivity is ensured for one part of the microplate and the additional functional unit uses the other part above and/or below the microplate as structural space.

Within the scope of the invention, an accessory apparatus, given an inserted microplate, can also be inserted into the receiving apparatus by way of it being plugged onto the interface device. Given suitable miniaturization of the accessory apparatus, a further mechanical mount can be dispensed with. Preferably, e.g. sensors can be plugged onto the interface device in order to measure measurement values such as air humidity, for example, in direct proximity to the sample.

In one embodiment of an accessory apparatus, the latter is configured to be inserted into the receiving apparatus of the microplate reader jointly with a microplate and has at least one temperature regulating unit, in particular heating facility, which is controlled and supplied with energy via the interface device in order to regulate the temperature of samples contained in wells of the microplate. In particular, an incubation function of the microplate reader can be created or improved in this way.

In a further embodiment, the accessory apparatus can be configured to be inserted into the receiving apparatus of the microplate reader jointly with a microplate—above or below the latter—and has at least one illumination device, which is controlled and supplied with energy via the interface device. In this way, with the wells of the microplate having been filled with samples, by means of light irradiation, a reaction can be brought about or an optical property can be measured. The illumination device can be configured in particular to generate an individual irradiation of the individual wells of the microplate. This can be achieved for example by means of individual LEDs respectively for the wells. The LEDs can be controlled and supplied via the interface of the receiving apparatus. In this regard, experiments are possible, for example, which require a continuous or time-controlled irradiation of all the samples, even if the samples are measured successively, for example in fluorescence.

In a further embodiment, the accessory apparatus is configured to be inserted into the receiving apparatus of the microplate reader jointly with a microplate and has electrodes leading to one or more of the wells of the microplate and also control or measurement electronics that are connected to the electrodes and are controlled via the interface device in order to electrically excite samples contained in the wells of the microplate or to measure an electrical property of the samples. Consequently, electrical measurements or electrical excitations can also be performed at the same time as a photometric examination. In particular, a reaction can be brought about by an electrical excitation of the samples, which reaction is then in turn observed photometrically.

In a further embodiment, the accessory apparatus is configured to be inserted into the receiving apparatus of the microplate reader and has at least one temperature sensor, the temperature measurement values of which are transmitted via the interface device. Such a temperature measuring function can be used in particular for the checking or calibration of an incubation function of the microplate reader. The accessory apparatus can be configured more extensively to carry sample containers in order to introduce at least one probe of the at least one temperature sensor into the container in order to measure the sample temperature directly.

In a further embodiment, the accessory apparatus is configured to be inserted into the receiving apparatus of the microplate reader and has at least one moisture sensor, the air humidity measurement values of which are transmitted via the interface device. Such a moisture sensor can likewise be used for the checking or calibration of an incubation function of the microplate reader.

In a further embodiment, the accessory apparatus is configured to be inserted into the receiving apparatus of the microplate reader and has at least one sensor for detecting the location or acceleration, the position or acceleration values of which are transmitted via the interface device. Such a location or acceleration sensor is helpful in particular for the checking or calibration of the positioning mechanism of the microplate reader, in order for example to ensure that the individual wells of a microplate of predefined design are positioned correctly in the detection region of the optical detector.

In a further embodiment, the accessory apparatus is configured to be inserted into the receiving function of the microplate reader and has at least one gas sensor for detecting an artificially produced atmosphere, the measurement values for measured gas concentrations of said gas sensor being transmitted via the interface device. Such a gas sensor is helpful in particular for the checking or calibration of an atmosphere regulating function of the microplate reader.

In a further embodiment, the accessory apparatus is configured to be inserted into the receiving apparatus of the microplate reader and has at least one optical sensor for measuring an excitation light source of the microplate reader, the measurement values of which are transmitted via the interface device. Such an optical sensor is helpful in particular for the checking or calibration of an excitation light source of the microplate reader.

In a further embodiment, the accessory apparatus is configured to be inserted into the receiving apparatus of the microplate reader and has at least one light source configured to generate an optical signal with a controllable intensity, wavelength and/or signal profile, said light source being supplied with energy and controlled via the interface device. Such a light source is helpful in particular for the checking or calibration of the optical detector of the microplate reader or of further measuring systems installed in the microplate reader. Such a light source can likewise be used for irradiating samples with or without excitation of the relevant sample. To that end, slots or positional locations for sample containers can be provided on the accessory apparatus.

In a further embodiment, the accessory apparatus is configured to be inserted into the receiving apparatus of the microplate reader and has at least one touch or proximity sensor, the measurement values of which are transmitted via the interface device. Such a touch or proximity sensor is helpful in particular for the checking or calibration of positioning accuracies of movable subsystems of the microplate reader.

In a further embodiment, the accessory apparatus is configured to be inserted into the receiving apparatus of the microplate reader and has at least a UV light source for disinfecting the interior of the microplate reader, said UV light source being controlled and supplied with energy via the interface device. In this way, the interior of the microplate reader can be disinfected simply and rapidly by insertion of the corresponding accessory apparatus.

In a further embodiment, the accessory apparatus is configured to be inserted into the receiving apparatus of the microplate reader and has at least one vacuuming apparatus for cleaning the interior or a blowing apparatus for cleaning lens elements of the microplate reader, said apparatus being controlled and supplied with energy via the interface device. Cleaning of the interior and of optical lens elements can thus be carried out in a simple manner by insertion of the corresponding accessory apparatus.

In a further embodiment, the accessory apparatus is configured to be inserted into the receiving apparatus of the microplate reader and has at least one fan, which is controlled and supplied with energy via the interface device for the purpose of rapid cooling or for the purpose of rapid change of air in the interior of the microplate reader.

In a further embodiment, the accessory apparatus is configured to be inserted into the receiving apparatus of the microplate reader and has for its part a movable receptacle for a microplate or some other sample holder, and also a drive coupled to the movable receptacle and serving for shaking or intermixing samples, in particular by means of ultrasound, wherein the drive is controlled and supplied with energy via the interface device. Samples contained in the microplate can thus be intermixed and shaken by the accessory apparatus before, during or between measurements.

In a further embodiment, the accessory apparatus is configured to be inserted into the receiving apparatus jointly with a microplate and has an actuator for applying reagents, which is controlled via the interface device, and also a distribution system for distributing the reagents into the wells of the microplate. In particular, the actuator can be embodied as a valve or metering pump and the distribution system can be embodied as a microchannel system. In this way, reactions proceeding in the wells can be maintained, initiated or supported in some other way.

In a further embodiment, the accessory apparatus is configured to be inserted into the receiving apparatus jointly with a microplate and has at least one apparatus for feeding and optionally distributing at least one medium to at least one of the wells of the microplate, wherein the medium is provided via the interface device. Said medium can be for example a modified atmosphere or air humidity to which samples contained in the wells are intended to be exposed.

In a further embodiment, the accessory apparatus is configured to be inserted into the receiving apparatus jointly with a microplate and has at least one apparatus for atomizing liquids for mist formation, preferably water being nebulized by an ultrasonic transmitter in order to produce a suitable air humidity over the samples of the microplate. The humid atmosphere can be prevented from volatilizing by a cover, or be slowed down with a perforated cover. A nebulization accessory that is inserted instead of the microplate carries e.g. a reservoir for the medium to be evaporated with an interior ultrasonic transmitter and also slots or positioning locations for sample containers.

The accessory apparatus can also be configured to provide information concerning the microplate. The accessory apparatus accordingly comprises a static or rewritable storage apparatus, in which information concerning the microplate is stored or can be stored. The storage apparatus can be configured in particular in the form of an RFID or other near-field chip. In this case, it is advantageous in particular if the accessory apparatus is connected to an associated microplate in a non-releasable manner. By way of example, information for identification and also measurement data inter alia concerning the various samples in the individual wells of the microplate can be stored in the storage apparatus.

The scope of the present invention additionally encompasses a microplate reader which is equipped with an accessory apparatus of the type mentioned above, said accessory apparatus being inserted into the receiving apparatus.

BRIEF DESCRIPTION OF THE DRAWINGS

Further advantages and properties of the present invention will become apparent from the following description of exemplary embodiments with reference to the figures, in which.

DETAILED DESCRIPTION

Figure 1:
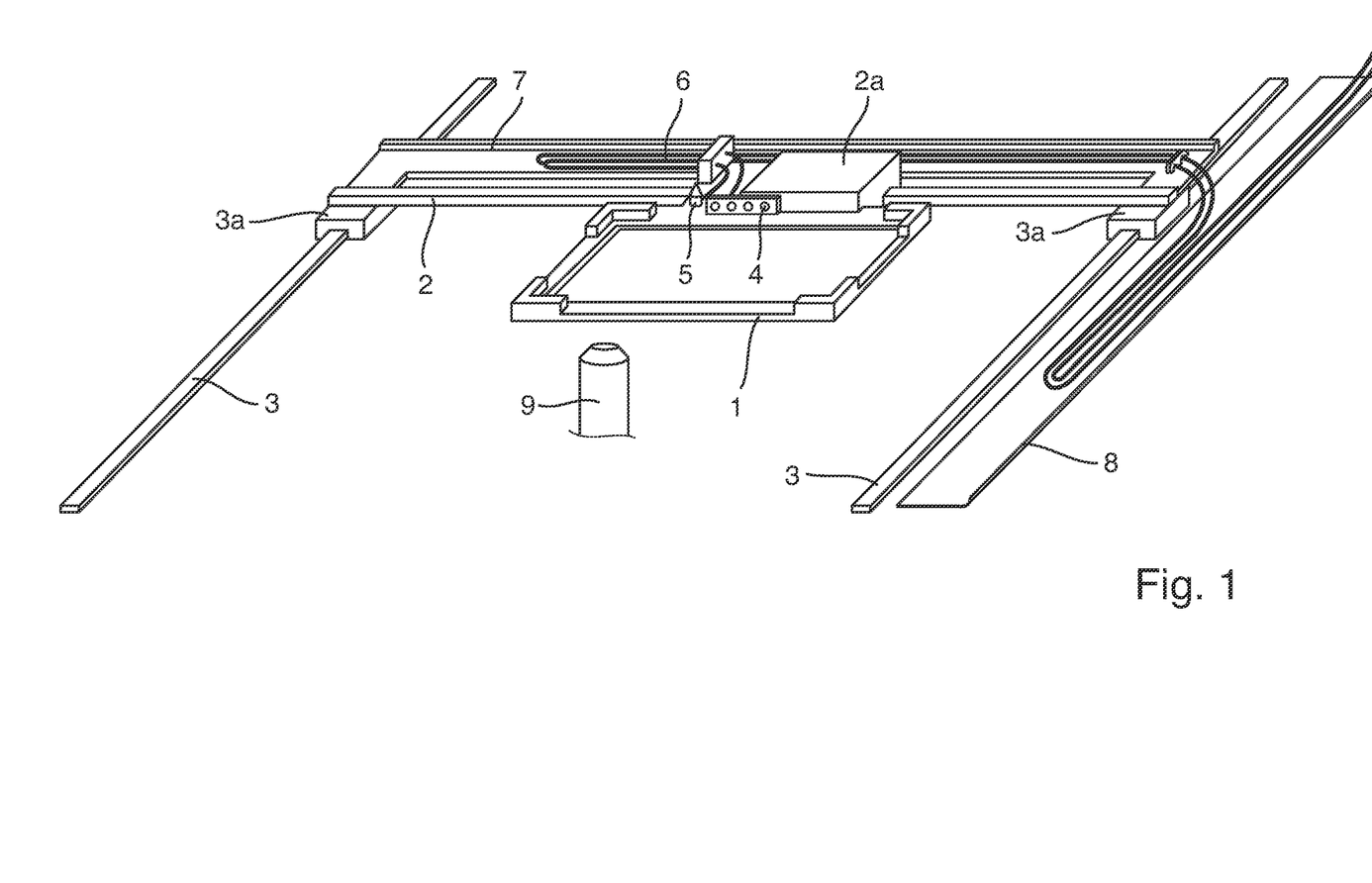
FIG. 1 shows a positioning mechanism of a microplate reader comprising a receiving apparatus for microplates that is arranged movably thereon, said receiving apparatus being provided with an interface device.

The essential components of a microplate reader are illustrated by way of example in FIG. 1. The microplate reader comprises a receiving apparatus 1 for receiving a microplate serving as a sample carrier. The receptacle 1 is referred to hereinafter as a plate carrier. It receives a microplate at its edge and secures it against lateral slipping at the corners. In this case, provision can also be made of additional holding means, not shown in FIG. 1, such as a spring or a spring mechanism, for instance, which additionally secures the microplate in the plate carrier 1.

The plate carrier 1 is held on a slide 2a of a linear guide 2, said slide being linearly movable in the X-direction. The linear guide 2 is in turn secured to two lateral linear guides 3 by way of two slides 3a that are linearly movable in the Y-direction. By way of the linear guides 2, 3, the plate carrier 1 and with it a microplate received therein can be positioned freely in the X- and Y-directions. An optical detector 9 is arranged below the plate carrier 1. The optical detector 9 can be a photomultiplier, for example, which can be used to measure the intensity of a light radiation emitted or transmitted by a sample. In addition, an excitation light source, not illustrated here, can be provided in order to optically excite the samples to be measured or to measure an absorption upon passage through the sample. Instead of a photomultiplier, it is also possible to use other optical detectors such as, for instance, a photocell, a CMOS or CCD sensor, a microchannel plate (MCP), a photodiode, a photoresistor, etc., and in particular also a camera for image recording.

In order to carry out a measurement, the microplate is moved by way of the positioning system formed by the linear guides 2, 3 such that the individual wells of the microplate are situated successively at the measurement position defined by the detection region of the optical detector 9. In FIG. 1 the measurement position is defined by the axis of the optical detector 9, which measures the optical radiation perpendicular to the microplate from below. It goes without saying that an opposite arrangement is also possible, in which the optical detector is arranged above the microplate and measures the optical radiation above the microplate.

On that side of the plate carrier 1 which faces the slide 2a, there are situated an interface device comprising an electrical interface 4 for power supply and data transmission and also a tube connection 5, which serves for media supply for an accessory apparatus inserted into the plate carrier 1. The electrical interface 4 is realized by electrical contact pads arranged behind the receiving position of a microplate. In this case, the contact pads are arranged such that they have no effects during the use of a normal microplate. The tube connection 5 is likewise arranged behind the receiving position of the microplate. The interface device 4, 5 is connected by a multi-core cable and also a tube 6 to corresponding systems of the microplate reader, i.e. a control device and a medium supply device. Behind the linear guide 2 and laterally with respect to the right linear guide 3, there are situated guide plates 7, 8, in which the feed lines 6, i.e. cable and tube for the interface device 4, 5, are laid in each case in loops, such that the feed lines 6 can suitably follow the movement of the plate carrier in the X- and Y-directions.

Either in addition to a microplate or instead of a microplate, an accessory apparatus having suitable dimensions can be inserted into the plate carrier 1 and can be connected to the microplate reader via the interface device 4, 5. Such an accessory apparatus makes it possible to realize accessory functions that can be used for example for a specific measurement or for cleaning, calibration or qualification of the microplate reader.

Figure 2:
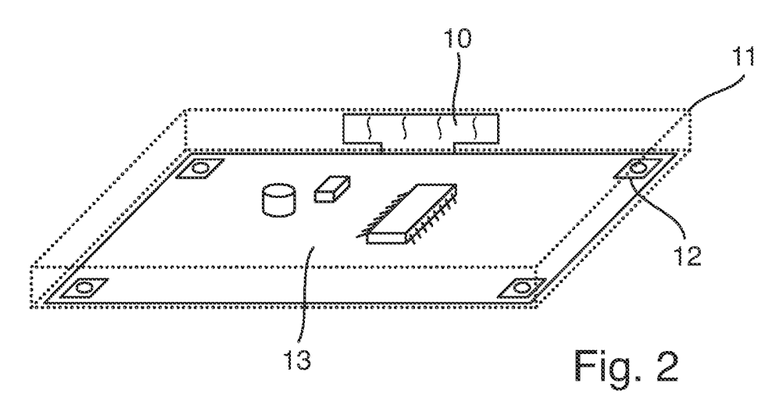
FIG. 2 shows an accessory apparatus that can be inserted into the receiving apparatus from FIG. 1.

FIG. 2 shows by way of example such an accessory apparatus that is inserted into the plate carrier 1 instead of a microplate. The accessory apparatus has contact springs 10 at its side facing rearward, said contact springs establishing an electrical connection to the contact pads of the electrical interface 4 upon insertion into the plate carrier 1. The housing 11 of the accessory apparatus is embodied such that it fits exactly into the plate carrier 1 and the contact springs 10, which form a counterpart station for the interface 4, are aligned at a corresponding position.

In the exemplary embodiment shown, the accessory apparatus contains a printed circuit board 13 with UV light sources 12 arranged at the corners, said UV light sources being controlled by control electronics accommodated on the printed circuit board 13 and being electrically supplied and activated via the electrical interface 4. In the exemplary embodiment, the UV light sources serve to kill possible microorganisms in the microplate space of the microplate reader and disinfect the microplate space in this way.

Instead of or in addition to the UV light sources 12, it is also possible, however, to arrange various sensors such as, for instance, a temperature sensor, a moisture sensor, a location or acceleration sensor, a gas sensor, an optical sensor for measuring an excitation light source of the microplate reader, touch or proximity sensors or else a fan or a vacuuming apparatus.

The accessory apparatus can also be configured such that it can be inserted into the plate carrier 1 together with a microplate. In this case, the accessory apparatus can have additional functions such as, for instance, a storage apparatus, a heating facility, an illumination device for the microplate, measurement or excitation electrodes or else a shaking apparatus for the microplate.

As a result, the interface device 4, 5 creates a universal interface that can be used to retrofit any desired additional functions with the aid of corresponding accessory apparatuses. Extendibility for later retrofitting of additional functions thus results in addition to diverse possibilities of use.

Figure 3:
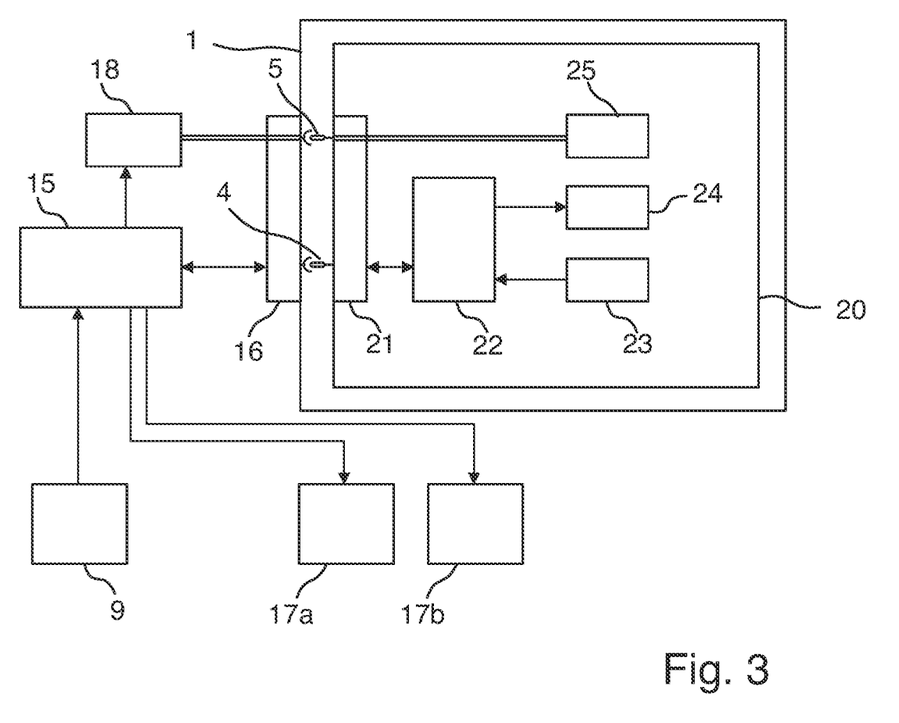
FIG. 3 shows a block diagram of a microplate reader.

FIG. 3 illustrates a block diagram of the microplate reader again. The latter comprises a receiving apparatus 1 for microplates, wherein an interface device 16 comprising an electrical interface 4 and a media interface 5 is arranged on the receiving apparatus 1. An accessory apparatus 20 is inserted into the receiving apparatus 1. Said accessory apparatus has a counterpart station 21 appropriately matching the interface device 16, which together with the interface device 16 brings about an electrical connection and a media connection between microplate reader and accessory apparatus 20. In this case, the accessory apparatus 20 can be inserted into the receiving apparatus together with or instead of a microplate.

The accessory apparatus 20 has a control and measuring circuit 22, which can be realized by a microprocessor, for example. The control and measuring circuit 22 is connected to one or more sensors 23, reads out the measurement values thereof and communicates them to the microplate reader via the interface device 16. Moreover, the control and measuring circuit 22 is connected to one or more actuators 24.

Depending on the application, actuators can be for example a heating facility, an illumination device, a UV light source, electrodes or an actuator such as, for instance, a valve, or a metering pump, a vacuuming apparatus or a fan. Depending on the application, sensors can be a temperature sensor, a moisture sensor, a location or acceleration sensor, a gas sensor, an optical sensor, a touch or proximity sensor or the like.

Moreover, the accessory apparatus 20 has a media distributing apparatus 25 connected to the media connection 5 of the interface device, which media distributing apparatus passes on medium provided at the media connection 5 to individual wells of a microplate in an application-specific manner.

The microplate reader has a programmable control device 15 of a type known per se, for instance a control computer, controller, CPU, FPGA, microcontroller or the like. The control device is connected to the optical detector 9 and receives and processes the measurement values thereof. Moreover, the control device 15 is connected to drive motors 17a, 17b, by which the linear guides 2, 3 shown in FIG. 1 are driven. The control device 15 can thus position a microplate inserted in the receiving apparatus 1 such that the individual wells of the microplate are successively brought into the detection region of the detector 9, and the microplate can thus be read well by well.

Moreover, the control device 15 is connected to the interface device 16 and, via the latter, receives data signals from the control and measuring circuit 22 or transmits command signals to the control and measuring circuit 22. Finally, the control device 15 is connected to a medium supply device 18 and controls the latter. The medium supply device 18 is connected to the media distributing apparatus 25 of the accessory apparatus via a tube line and the media connection 5. The medium supply device 18 provides one or more media for the distributing apparatus 25 of the accessory apparatus 20 via the media connection 5 of the interface device 16. The medium supply device 18 can be realized for example by a media pump and a media container connected thereto.

Figure 4:
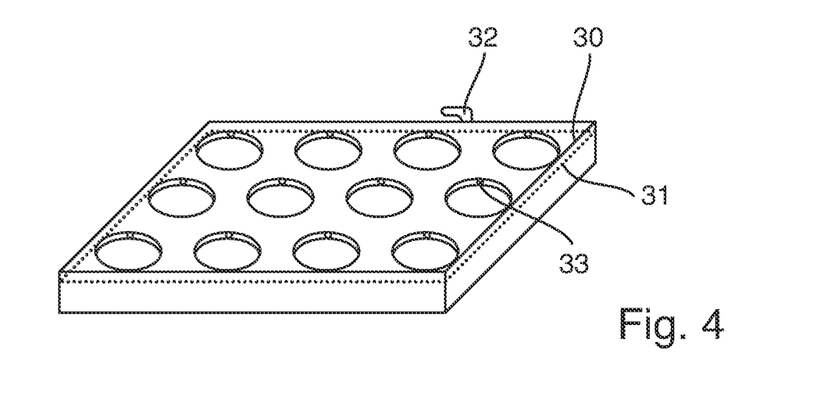
FIG. 4 shows an accessory apparatus for media distribution on a microplate inserted jointly with the accessory apparatus.

FIG. 4 shows by way of example an accessory apparatus that is inserted into the plate carrier 1 jointly with a 12-well microplate. For this purpose, the accessory apparatus is placed onto the microplate like a cover. In a manner appropriately matching each microplate well, the accessory has an opening through which the measurement can take place in an unimpeded manner. The accessory apparatus has a cavity between an upper wall 30 and a lower wall 31, via which cavity the medium can be distributed. Via a tube connection 32 appropriately matching the interface device of the microplate reader, the medium is introduced into said cavity and flows out through in each case at least one nozzle 33 per microplate well. What is achieved as a result is that the introduced atmosphere passes directly to the sample and the point in time of the gas feed is specified exactly for all of the samples, in contrast to the introduction of gas into the entire incubator. In this regard, the gas consumption is reduced and the change of atmosphere is accomplished abruptly. A gas sensor, not shown in FIG. 4, constitutes an expedient supplementation to the media distribution and can be attached to a corresponding data and power connection of the interface device in order to measure a gas concentration in direct proximity to the microplate.

Figure 5:
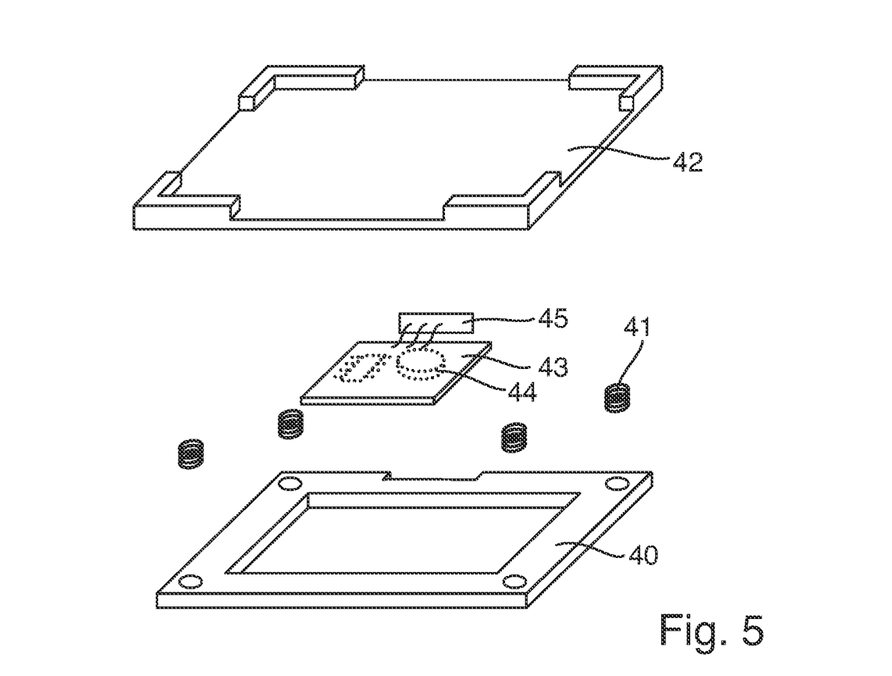
FIG. 5 shows, in an exploded illustration, an accessory apparatus for shaking a microplate inserted jointly with the accessory apparatus.

FIG. 5 shows in a further exemplary embodiment, as an exploded drawing, the construction of an accessory apparatus that receives a microplate and is inserted into the plate carrier jointly with the microplate. The accessory apparatus serves for shaking the sample in order to intermix the liquid(s) of the sample. The shaking of samples that is produced by movement of the plate carrier is typically limited in terms of the shaking frequency to a few hundred RPM owing to the inertia of the plate carrier and of the moving parts. In order to achieve higher shaking frequencies up to thousands of RPM, the accessory apparatus shown is inserted jointly with the microplate into the plate carrier, which moves the microplate relative to the plate carrier by means of a vibration motor. The accessory apparatus shown enables the measurement from above, e.g. fluorescence or luminescence.

As shown in FIG. 5, the accessory apparatus comprises a frame 20, which fits into the plate carrier of the microplate reader. The receptacle 22 for the microplate is mounted onto this by way of an oscillatory suspension, by way of springs 21 in the example. The receptacle is preferably of very lightweight construction, i.e. has a low mechanical inertia. A printed circuit board 23 carrying a controller and a vibration motor 24 is mounted on the underside of the receptacle. The printed circuit board is connected via a cable connection to a contacting device 25 appropriately matching the interface device of the plate carrier, said contacting device being mounted onto the frame such that a connection is established upon insertion into the plate carrier.

Figure 6:
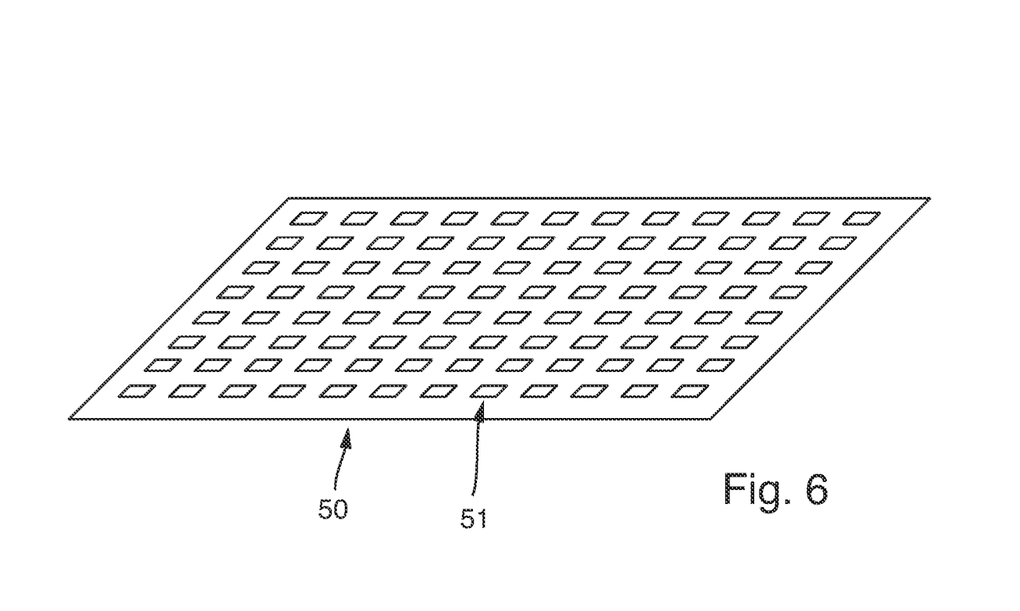
FIG. 6 shows an accessory apparatus comprising an illumination device composed of 96 LEDs for a microplate inserted jointly with the accessory apparatus.

FIG. 6 shows an accessory apparatus in the form of a printed circuit board with 96 LEDs that are placed into the plate carrier jointly with the microplate in order to obtain an individual irradiation of each well of a 96-well microplate. The supply and control of the LEDs are achieved by means of plug contacts via the interface of the plate carrier. All or individual wells of a 96-well microplate can thus be illuminated in a targeted manner, for example in order to support biological or photochemical processes proceeding therein, and can be momentarily switched off individually for a measurement at the relevant well.

The invention claimed is:

1. A microplate reader comprising:
a receiving apparatus (1) for receiving a microplate having predefined dimensions and having a multiplicity of wells;
an optical detector (9) configured to detect an optical radiation at respective individual ones of the wells from among the wells of the microplate that has been received in the receiving apparatus;
the receiving apparatus is arranged for movement in at least one spatial direction by a positioning mechanism (2, 3) configured to position the received microplate relative to the optical detector (9) for successive measurements at different wells; and
the receiving apparatus (1) has an interface device (16) configured to provide at least one of an energy connection, a data connection, a media supply connection, or media disposal from the microplate reader to an accessory apparatus for additional functions that is inserted into the receiving apparatus (1) jointly with or instead of the microplate or another sample container;
wherein the interface device (16) provides a media interface (5) embodied as a tube connection (5) for the at least one of the media supply or the media disposal.

2. The microplate reader as claimed in claim 1, wherein the interface device (16) is configured to establish the at least one of the energy connection or the data connection via at least one of electrical contacts (4), optical signal transmission, or by coupling via electric, magnetic or electromagnetic fields.

3. The microplate reader as claimed in claim 1, wherein the at least one of the media supply or the media disposal is for at least one of the following media: air, CO2, oxygen, nitrogen, water, reagents.

4. The microplate reader as claimed in claim 1, further comprising a controller (15) configured to activate via the interface device (16) additional functions of an accessory apparatus (20) that is inserted into the receiving apparatus (1) jointly with or instead of the microplate.

5. A combination of an accessory apparatus and the microplate reader as claimed in claim 4, comprising a counterpart station (21, 10), which interacts with the interface device (16) of the microplate reader and via which an additional function provided by the accessory apparatus (20) is at least one of controlled or supplied with energy.

6. The combination as claimed in claim 5, wherein the accessory apparatus (20) is configured to be inserted into the receiving apparatus of the microplate reader jointly with the microplate and has at least one of the following devices:
(a) a temperature regulating unit that is controlled and supplied with energy via the interface device (16) in order to regulate a temperature of samples contained in the wells of the microplate;
(b) an illumination device that is controlled and supplied with energy via the interface device (16);
(c) electrodes leading to one or more of the wells of the microplate and control or measurement electronics that are connected to the electrodes and are controlled via the interface device (16) in order to electrically excite samples contained in the wells of the microplate or to measure an electrical property of the samples;
(d) an apparatus for feeding at least one medium to at least one of the wells of the microplate, wherein the medium is provided via the interface device (16); or
(e) an actuator for applying reagents, which is controlled via the interface device (16), and a distribution system for distributing the reagents into the wells of the microplate.

7. The combination as claimed in claim 6, wherein the actuator is a valve or a metering pump, and the distribution system is a microchannel system.

8. The combination as claimed in claim 5, wherein the accessory apparatus (20) has a movable receptacle for the microplate or some other sample container, and a drive coupled to the movable receptacle configured for shaking and intermixing samples, and the drive is controlled and supplied with energy via the interface device (16).

9. The combination as claimed in claim 8, wherein the drive comprises an ultrasonic shaker.

10. The combination as claimed in claim 5, wherein the accessory apparatus is configured to be inserted into the receiving apparatus of the microplate reader and has one of the following devices:
(a) a temperature sensor, temperature measurement values of which are transmitted via the interface device (16);
(b) a moisture sensor, air humidity measurement values of which are transmitted via the interface device (16);
(c) a sensor for detecting a location or acceleration, position or acceleration values of which are transmitted via the interface device (16);
(d) a gas sensor for detecting an artificially produced atmosphere, measurement values for measured gas concentrations of said gas sensor being transmitted via the interface device (16);
(e) an optical sensor for measuring an excitation light source of the microplate reader, measurement values of which are transmitted via the interface device (16);
(f) a light source configured to generate an optical signal with at least one of a controllable intensity, wavelength, or signal profile, said light source being supplied with energy and controlled via the interface device (16);
(g) a touch or proximity sensor, measurement values of which are transmitted via the interface device (16);
(h) a UV light source (12) for disinfecting an interior of the microplate reader, said UV light source being controlled and supplied with energy via the interface device (16);
(i) at least one vacuuming apparatus for cleaning an interior of the microplate reader, said at least one vacuuming apparatus being controlled and supplied with energy via the interface device (16);
(j) a blowing apparatus for cleaning optical units in the microplate reader, said blowing apparatus being controlled and supplied with energy via the interface device (16); or
(k) a fan, which is controlled and supplied with energy via the interface device (16) for rapid cooling or rapid change of air in an interior of the microplate reader.

11. The combination as claimed in claim 5, wherein the accessory apparatus (20) is configured to be inserted into the receiving apparatus of the microplate reader and has at least one slot or positioning locations for a sample container.

12. A microplate reader comprising:
a receiving apparatus (1) for receiving a microplate having predefined dimensions and having a multiplicity of wells;
an optical detector (9) configured to detect an optical radiation at respective individual ones of the wells from among the wells of the microplate that has been received in the receiving apparatus;
the receiving apparatus is arranged for movement in at least one spatial direction by a positioning mechanism (2, 3) configured to position the received microplate relative to the optical detector (9) for successive measurements at different wells;
the receiving apparatus (1) has an interface device (16) configured to provide at least one of an energy connection, a data connection, a media supply connection, or media disposal from the microplate reader to an accessory apparatus for additional functions that is inserted into the receiving apparatus (1) jointly with or instead of the microplate or another sample container; and
a controller (15) configured to activate via the interface device (16) additional functions of an accessory apparatus (20) that is inserted into the receiving apparatus (1) jointly with or instead of the microplate.

13. The microplate reader as claimed in claim 12, wherein the interface device (16) is configured to establish the at least one of the energy connection or the data connection via at least one of electrical contacts (4), optical signal transmission, or by coupling via electric, magnetic or electromagnetic fields.

14. The microplate reader as claimed in claim 12, wherein the at least one of the media supply or the media disposal is for at least one of the following media: air, CO2, oxygen, nitrogen, water, reagents.

15. A combination of an accessory apparatus and the microplate reader as claimed in claim 12, comprising a counterpart station (21, 10), which interacts with the interface device (16) of the microplate reader and via which an additional function provided by the accessory apparatus (20) is at least one of controlled or supplied with energy.

16. The combination as claimed in claim 15, wherein the accessory apparatus (20) is configured to be inserted into the receiving apparatus of the microplate reader jointly with the microplate and has at least one of the following devices:
   (a) a temperature regulating unit that is controlled and supplied with energy via the interface device (16) in order to regulate a temperature of samples contained in the wells of the microplate;
   (b) an illumination device that is controlled and supplied with energy via the interface device (16);
   (c) electrodes leading to one or more of the wells of the microplate and control or measurement electronics that are connected to the electrodes and are controlled via the interface device (16) in order to electrically excite samples contained in the wells of the microplate or to measure an electrical property of the samples;
   (d) an apparatus for feeding at least one medium to at least one of the wells of the microplate, wherein the medium is provided via the interface device (16); or
   (e) an actuator for applying reagents, which is controlled via the interface device (16), and a distribution system for distributing the reagents into the wells of the microplate.

17. The combination as claimed in claim 16, wherein the actuator is a valve or a metering pump, and the distribution system is a microchannel system.

18. The combination as claimed in claim 15, wherein the accessory apparatus (20) has a movable receptacle for the microplate or some other sample container, and a drive coupled to the movable receptacle configured for shaking and intermixing samples, and the drive is controlled and supplied with energy via the interface device (16).

19. The combination as claimed in claim 18, wherein the drive comprises an ultrasonic shaker.

20. The combination as claimed in claim 15, wherein the accessory apparatus is configured to be inserted into the receiving apparatus of the microplate reader and has one of the following devices:
   (a) a temperature sensor, temperature measurement values of which are transmitted via the interface device (16);
   (b) a moisture sensor, air humidity measurement values of which are transmitted via the interface device (16);
   (c) a sensor for detecting a location or acceleration, position or acceleration values of which are transmitted via the interface device (16);
   (d) a gas sensor for detecting an artificially produced atmosphere, measurement values for measured gas concentrations of said gas sensor being transmitted via the interface device (16);
   (e) an optical sensor for measuring an excitation light source of the microplate reader, measurement values of which are transmitted via the interface device (16);
   (f) a light source configured to generate an optical signal with at least one of a controllable intensity, wavelength, or signal profile, said light source being supplied with energy and controlled via the interface device (16);
   (g) a touch or proximity sensor, measurement values of which are transmitted via the interface device (16);
   (h) a UV light source (12) for disinfecting an interior of the microplate reader, said UV light source being controlled and supplied with energy via the interface device (16);
   (i) at least one vacuuming apparatus for cleaning an interior of the microplate reader, said at least one vacuuming apparatus being controlled and supplied with energy via the interface device (16);
   (j) a blowing apparatus for cleaning optical units in the microplate reader, said blowing apparatus being controlled and supplied with energy via the interface device (16); or
   (k) a fan, which is controlled and supplied with energy via the interface device (16) for rapid cooling or rapid change of air in an interior of the microplate reader.

21. The combination as claimed in claim 15, wherein the accessory apparatus (20) is configured to be inserted into the receiving apparatus of the microplate reader and has at least one slot or positioning locations for a sample container.

* * * * *